United States Patent

[11] 3,566,045

[72] Inventors T. O. Paine
Deputy Administrator of the National Aeronautics and Space Administration with respect to an invention of;
James D. Kern, Capinteria; Valdimar W. Vodicka, Santa Barbara, Calif.

[21] Appl. No. 762,957
[22] Filed Sept. 26, 1968
[45] Patented Feb. 23, 1971

[54] MAGNETIC RECORDING HEAD AND METHOD OF MAKING SAME
4 Claims, 2 Drawing Figs.

[52] U.S. Cl. ........................................................ 179/100.2, 29/603, 340/174.1
[51] Int. Cl. ........................................................ G11b 5/22, G11b 5/42
[50] Field of Search ........................................................ 179/100.2 (C); 340/174.1 (F); 346/74 (MC); 29/603

[56] References Cited

UNITED STATES PATENTS

| | | | |
|---|---|---|---|
| 3,268,987 | 8/1966 | Adams ......................... | 29/603 |
| 3,335,412 | 8/1967 | Matsumoto .................. | 179/100.2 |

*Primary Examiner*—J. Russell Goudeau
*Attorney*—R. F. Kempf, E. Levy and G. T. McCoy

ABSTRACT: A magnetic recording head comprising a ferrite core having a thin film of Alfesil coated thereon and a method of producing same using a plasma arc sputtering technique.

PATENTED FEB 23 1971 3,566,045

INVENTORS
JAMES D. KERN
VALDIMAR W. VODICKA

BY [signatures]
ATTORNEYS

MAGNETIC RECORDING HEAD AND METHOD OF MAKING SAME

The invention described herein was made in the performance of work under a NASA contract and is subject to the provisions of Section 305 of the National Aeronautics and Space Act of 1958, Public Law 85-568 (72 Stat. 435; 42 USC 2457).

This invention relates to a new magnetic recording head having a greatly extended lifespan. More particularly, this invention is directed to a magnetic recording head composed of a ferrite core coated by a thin film of Alfesil.

The need to develop high-quality magnetic recording heads with extended life has become imperative with the advent of unattended recorders such as used in space applications. Heretofore most high-quality recording heads have been constructed with Hy-Mu material for the pole pieces. This material, while exhibiting many desirable properties, is inherently soft and therefore has a limited lifespan. Ferrite pole pieces are occasionally used since they are extremely hard, but when used with magnetic tape they exhibit undesirable effects such as chipping, crystal pullout and porosity. As is evident voids on the surface of the pole pieces are undesirable as they will load with oxide and then act as an abrasive to the tape reducing its life.

A magnetic material that has a very high permeability and a high saturation characteristic is a magnetic alloy consisting of silicon, aluminum and iron. This magnetic alloy, referred to as Alfesil, is described in U.S. Pat. No. 2,193,768. The inherent characteristics of Alfesil make it a desirable alloy for magnetic head assemblies. Recently a magnetic head assembly utilizing a slab of Alfesil has been suggested. U.S. Pat. No. 3,303,292 presents a head composed of a slab of Alfesil joined to a slab of ferrite by an epoxy seal. The use of an epoxy bond has, however, created disadvantages of its own in the magnetic head assemblies, since the epoxy interface itself is nonmagnetic. It might also be noted that bulk Alfesil itself is difficult to work with. The only way to shape it is by diamond grinding and this machining usually results in a high degree of chipping and breaking due to weak intercrystalline bonding of the Alfesil crystals.

An object of this invention is to provide a novel and improved magnetic head assembly.

Another object of the invention is to provide a magnetic head assembly that is easy to manufacture, and which retains the feature of high permeability and resistivity after the manufacturing process.

A further object is to provide a magnetic recording assembly having a greatly increased lifespan.

It has now been found that the above objects and others may be accomplished by providing a magnetic recording head composed of a ferrite core with a thin film of Alfesil deposited thereon.

In the drawings, FIG. 1 represents the completed magnetic recording head and FIG. 2 is a cross section of the head taken along the plane coincident with line 2–2.

Figure 1:
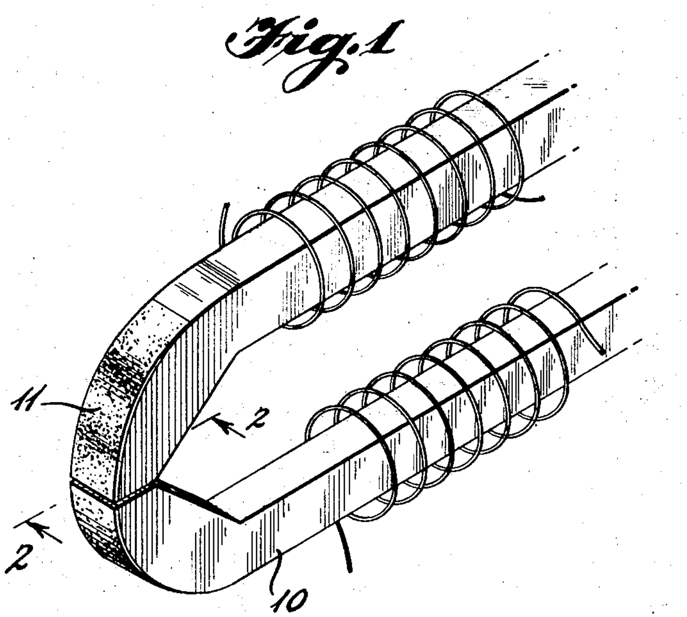
FIG. 1 shows the ferrite core 10 wherein an Alfesil film 11 is directly coated on the working surface of the head.
Figure 2:
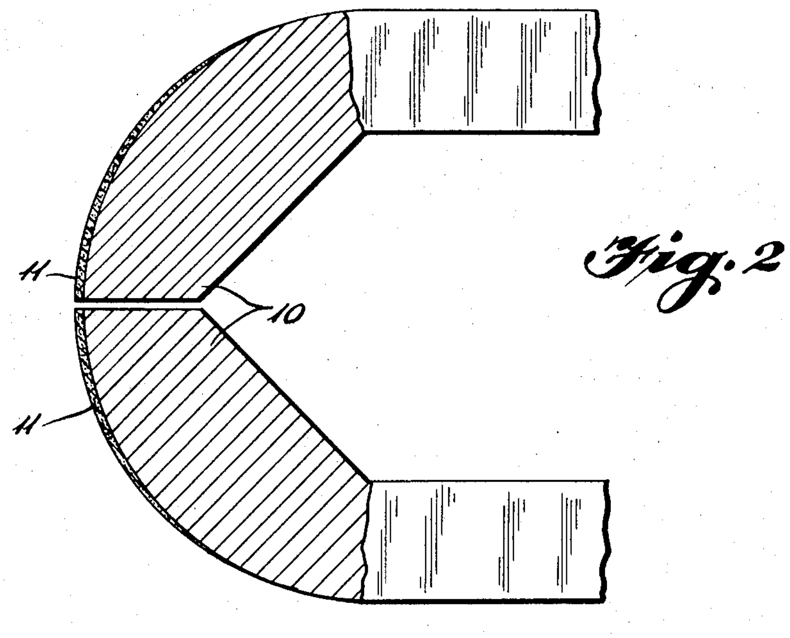
FIG. 2 represents a cross section of the head to show the integral bond between the Alfesil film 11 coated onto the ferrite core 10.

The technique used to deposite the Alfesil coating upon the ferrite core is the so-called "plasma arc sputtering". This is a well-developed technique that has gained acceptance for the deposition of various alloys on substrate materials. For a general description of deposition technique commonly referred to as "sputtering," reference is made to that certain article published in Scientific Foundations of Vacuum Technique, Saul Dushman and J. M. Lafferty, John Wiley & Sons, Inc., New York 1962.

A magnetic recording head according to this invention was made as follows using a conventional plasma arc sputtering device.

An electrically isolated ferrite substrate is mounted in a diametrically opposed relationship to the target or source and is clamped in position. The target or source is fabricated from bulk Alfesil. During the coating operation this target is cooled by conduction using a liquid flowing in a vacuumtight tubing system connected into the evacuated chamber from a refrigeration unit external to the chamber. To begin the coating process the target is electrically charged to a high negative potential. The area between the Alfesil target and the ferrite substrate contains the plasma between the electron source and the anode plate. At the outset of the process the chamber is evacuated down to a pressure of approximately $10^{-6}$ Torr and thereafter an argon atmosphere is introduced in until a pressure of approximately $10^{-3}$ is achieved. The argon gas is continuously introduced into the chamber through a gas inlet and removed by vacuum pump. In this specific operation, the Alfesil target or source and the ferrite substrate are spaced apart a distance of approximately 1½inches.

The cathode or filament is heated to a temperature sufficient to cause thermal emission of electrons. Simultaneously, the anode is maintained at a potential which is positive relative to that of the filament in order to attract the flow of electrons from the cathode into the area of the anode. While the thermally emitted electrons are flowing toward the anode, and while they are passing through the gas which is present in the chamber, collisions will occur with the molecules of the gas, and these collisions will dislodge electrons from the gas and thereby leave the particular gas particles in a positively charged state. All during this operation, the pumping system is continuously removing gas from the chamber, the pressure being maintained at a level of approximately $10^{-3}$ Torr. The argon gas entering the system is highly purified and thus sources of contamination are substantially minimized. The charged gas particles subsequently bombard the surface of the Alfesil target and the collisions which occur between the charged gas particles and the surface of the target cause a dislodging or removal of Alfesil from the surface of the target, which is then free to move toward the substrate and be deposited thereon as a film coating. A controllable percentage of the material thus dislodged will arrive at the surface of the substrate. In this operation, a potential of approximately 75 volts is applied to the anode while a potential of approximately 700 volts is applied to the source material or target, from their respective power supplies.

During the operation, the ferrite substrate is maintained at floating potential. Accordingly, the gaseous plasma attracted to the negatively charged target will sputter the Alfesil target material from the target to the ferrite substrate being coated. The rate of the film accumulation on the surface of the substrate under these conditions will be 50—300 Angstroms per minute. Using this conventional plasma arc sputtering technique the thickness of the Alfesil coating may be varied from 0.0015 to 0.004 inches.

In order to demonstrate the advantages obtained by the use of the Alfesil-coated ferrite head over the conventionally used materials an accelerated life test was run on an operational head. The operational head consisted of tracks with cores of Alfesil-coated ferrite, ferrite only, and Hy-Mu 80, with dummy tracks on either side of each operational track to further space one from the other, thereby minimizing the support effect one track might have on the others. The head assembly to be tested was then mounted on a tape transport (Ampex Model FR1100, S/N 226) provided with a logic device to control automatic recycling of the tape to accumulate the long-wear run of 800 hours. Programming of intermediate and final stops was determined by a timelock controlling the power supply for the tape transport.

The programming of the life test was as follows: After 0, 50, 100, 200, 400, and 800 hours of running time the mechanical measurements of accumulated wear were made. The electrical tests consisted of testing the inductance and Q-factor. These were performed at 0, 400 and 800 hours. The frequency response of the heads was also checked at 0 and 800 hours of wear.

The results of the above tests were as follows: Profile Measurements; accumulated wear (inches) at the gap area

| | Hy Mu | Ferrite | Alfesil-coated ferrite |
|---|---|---|---|
| Running time, hrs.: | | | |
| 0 | 0 | 0 | 0 |
| 50 | .0001 | .00005 | 0 |
| 100 | .00015 | .00005 | 0 |
| 200 | .0002 | .00005 | 0 |
| 300 | .0003 | .00005 | 0 |
| 400 | .0005 | .00005 | 0 |
| 800 | .0008 | .0011 | .00005 |

The accuracy of the measurement is ±0.000025.

The marked resistance of the Alfesil coated ferrite track to wear results in an increase in the lifespan by a factor of 10 over the Hy-Mu 80 track.

ELECTRICAL MEASUREMENTS

Inductance in $\mu$h. per leg at 1 kc.:

| | Hy Mu 80 | Ferrite | Alfesil-coated ferrite |
|---|---|---|---|
| Time, hrs.: | | | |
| 0 | 146–144 | 139–138 | 154–152 |
| 400 | 143–142 | 138–140 | 153–154 |
| 800 | 141–142 | 134–134 | 150–152 |

Q-factor per leg at 1 kc.:

| | Hy Mu 80 | Ferrite | Alfesil-coated ferrite |
|---|---|---|---|
| Time, hrs.: | | | |
| 0 | .33–.32 | .18–.18 | .18–.19 |
| 400 | .35–.35 | .20–.20 | .21–.22 |
| 800 | .35–.35 | .19–.20 | .20–.22 |

Frequency response —the head was used as both a record and reproduce head.

Frequency response at 0 hours:

Track 01 Ferrite, 0.016 inch effective track width
Bias current =14.0 ma. r.m.s.
Signal current =1.35 ma. r.m.s.
Distortion =2.7 percent 3rd harmonic
Output at 1kc. −54.3 db =15 $\mu$v. r.m.s.
5kc. −44.3 db
Null at 19kc.

Track 02 Alfesil-coated ferrite, 0.14 inch effective track width
Bias Current =19.2 ma. r.m.s.
Signal Current =2.55 ma. r.m.s.
Distortion =2.7 percent 3rd harmonic
Output at 1kc. −64.5 db =4.5$\mu$v. r.m.s.
5kc. −53.2 db Track 03 Hy-Mu 80, 0.0195 inch effective track width
Bias current =9.2 ma. r.m.s.
Signal current =1.0 ma. r.m.s.
Distortion =2.7 percent 3rd harmonic
Output at 1kc. −50.3 db=24 v. r.m.s.
5kc. −41.5 db Frequency response after 800 hours of wear.

| | Output at 1 kc. | Output at 5 kc. |
|---|---|---|
| Track #1 | −54.5 db=14.3 $\mu$v. r.m.s. | −45.0 db |
| Track #2 | −50.5 db=8.1 $\mu$v. r.m.s. | −47.2 db |
| Track #3 | −51.5 db=21 $\mu$v. r.m.s. | −43.5 db |

The foregoing life test has shown that the Alfesil-coated ferrite recording heads of this invention have a markedly increased lifespan while exhibiting desirable inductance, Q-factor, and frequency response characteristics.

We claim:

1. A magnetic recording head comprising a ferrite core having a thin film of Alfesil plasma arc sputtered directly thereon.
2. A magnetic recoding as in claim 1 wherein the thickness of the Alfesil film is from 0.0015 inches to 0.004 inches.
3. A method of producing a magnetic recording head comprising plasma arc sputtering a coating of Alfesil directly to a ferrite core.
4. The method of claim 3 wherein the Alfesil coating is from 0.0015 to 0.004 inches thick.